United States Patent
Kang et al.

(10) Patent No.: US 9,438,450 B1
(45) Date of Patent: Sep. 6, 2016

(54) RECEIVER AND ASSOCIATED CONTROL METHOD

(71) Applicants: GLOBAL UNICHIP CORPORATION, Hsinchu (TW); TAIWAN SEMICONDUCTOR MANUFACTURING CO., LTD., Hsin-Chu (TW)

(72) Inventors: Wen-Juh Kang, Hsinchu (TW); Yu-Chu Chen, Hsinchu (TW); Yi-Lin Lee, Hsinchu (TW)

(73) Assignees: GLOBAL UNICHIP CORPORATION, Hsinchu (TW); TAIWAN SEMICONDUCTOR MANUFACTURING CO., LTD., Hsin-Chu (TW)

( * ) Notice: Subject to any disclaimer, the term of this patent is extended or adjusted under 35 U.S.C. 154(b) by 0 days.

(21) Appl. No.: 14/790,157

(22) Filed: Jul. 2, 2015

(51) Int. Cl.
  *H03H 7/30* (2006.01)
  *H03H 7/40* (2006.01)
  *H03K 5/159* (2006.01)
  *H04L 25/03* (2006.01)

(52) U.S. Cl.
  CPC ............... *H04L 25/03057* (2013.01)

(58) Field of Classification Search
  CPC ............................... H04L 25/03057
  USPC .......................................... 375/233
  See application file for complete search history.

(56) References Cited

U.S. PATENT DOCUMENTS

| | | | |
|---|---|---|---|
| 6,819,166 B1 | 11/2004 | Choi et al. | |
| 8,548,038 B2 | 10/2013 | Sindalovsky et al. | |
| 2008/0247452 A1 | 10/2008 | Lee | |
| 2010/0046598 A1 | 2/2010 | Zhong et al. | |
| 2010/0135378 A1* | 6/2010 | Lin | H04L 7/0025 375/233 |
| 2012/0076181 A1* | 3/2012 | Aziz | H04L 25/03057 375/219 |
| 2012/0128053 A1* | 5/2012 | Witt | H04L 25/03885 375/232 |
| 2013/0142244 A1 | 6/2013 | Tan | |
| 2013/0148712 A1 | 6/2013 | Malipatil et al. | |

* cited by examiner

*Primary Examiner* — Tanmay Shah
(74) *Attorney, Agent, or Firm* — WPAT, PC; Justin King (57) ABSTRACT

A receiver is provided. The receiver includes a CTLE receiving a received signal, and generating a first equalized signal by processing the received signal according to a pole and a boost level; a slicing circuit coupled to the CTLE, generating a data signal according to the first equalized signal and a feedback equalization signal; a DFE coupled to the slicing circuit, generating the feedback equalization signal by processing the data signal according to a DFE coefficient set. Furthermore, the boost level is adjusted according to a first DFE coefficient of the DFE coefficient set, while the pole is adjusted according to the second and third DFE coefficients.

10 Claims, 9 Drawing Sheets

RECEIVER AND ASSOCIATED CONTROL METHOD

FIELD OF THE INVENTION

The present invention relates to a receiver, and more particularly to a receiver capable of tuning boost level and pole according to decision feedback equalizer (DFE) coefficient set and associated control method.

BACKGROUND OF THE INVENTION

An electrical circuit (e.g., chip, die, integrated circuit, etc.) is one of the most essential hardware foundations of modern information society. Different electrical circuits can be connected into an interconnection system by channel(s), so these electrical circuits can exchange signals (e.g., information, data, messages, commands and/or packages) to coordinate and cooperate with each other for implementing integrated macro functions. However, the characteristics of the channel will impact the quality of signal exchange. Generally, the channel is of low-pass nature, and therefore will suppress high-frequency portion of the signal and cause signal distortion. For example, when an electrical circuit acts as a transmitter and transmits a signal of a square waveform to another electrical circuit which acts as a receiver, the receiver will receive a slowly rising and falling waveform, instead of a square waveform with sharp rising and falling edges. In the waveform received by the receiver, the slowly rising portion is referred to as a pre-cursor, the peak of slowly rising forms a main cursor, and the slowly falling portion after the peak is referred to as a post-cursor. Signal distortion will cause inter-symbol interference (ISI) and degrade the quality of signal transmission, e.g., increase bit error rate.

To compensate the impact of the channel, the transmitter and the receiver are respectively equipped with filtering and equalization mechanisms. For example, the filtering mechanism of the transmitter (Tx) can include a pre-emphasis filter for emphasizing the high-frequency portion of the signal of the transmitter, and the equalization mechanism of receiver (Rx) can include a CTLE (continuous time linear equalizer) and a DFE (decision feedback equalizer). When a transmitter intends to send a signal to a receiver, the filter of the transmitter will filter the outgoing signal based on a plurality of filter taps, so the filtered signal can be driven to a channel. When the receiver receives the incoming signal from the channel, the receiver will equalize the received signal based on a plurality of equalizer taps, and then retrieve the contents and/or other information (e.g., clock) from the equalized signal.

Figure 1:
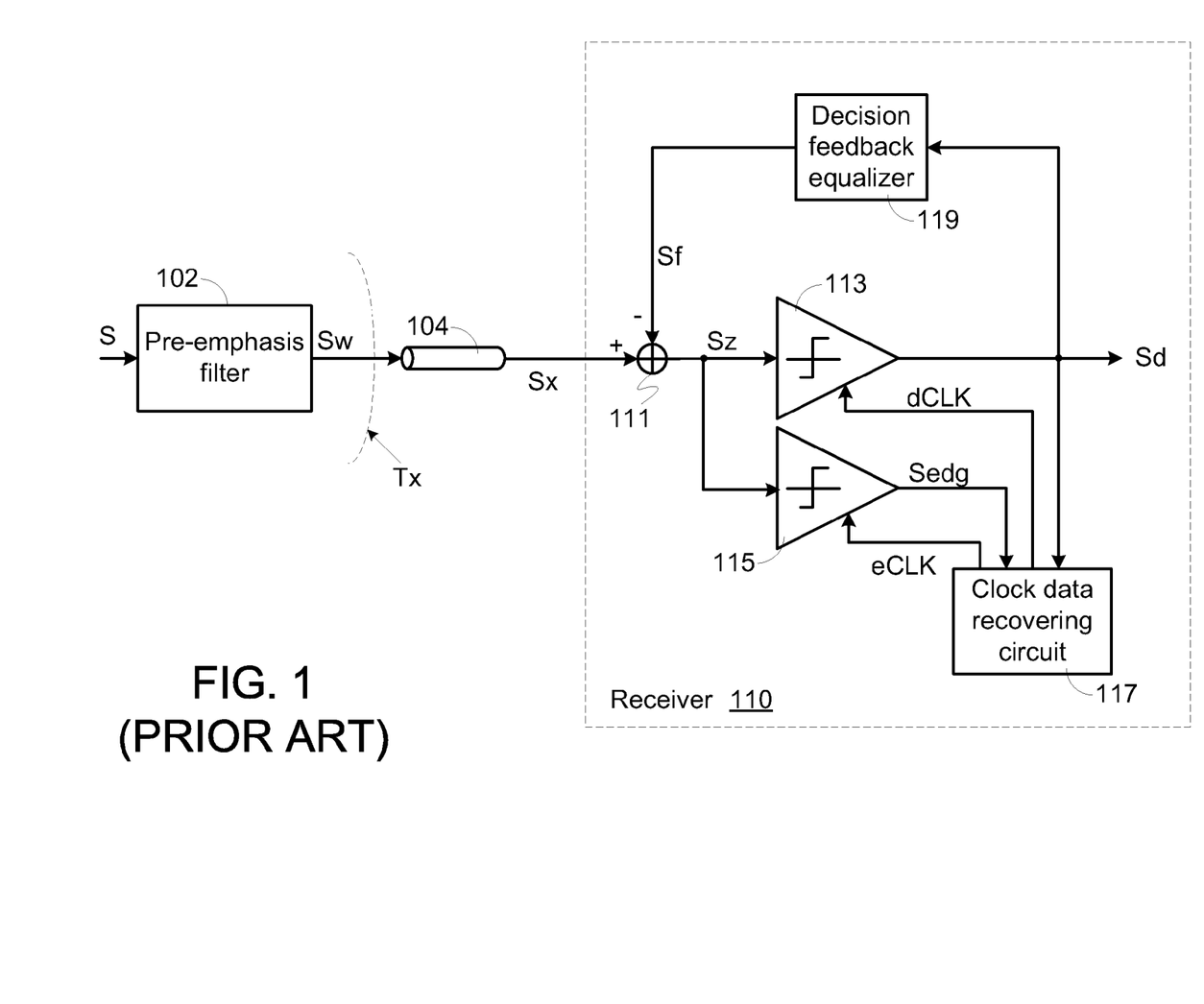
FIG. 1 (prior art) is a schematic circuit diagram illustrating a conventional receiver.

FIG. 1 is a schematic circuit diagram illustrating a conventional receiver. In the electrical circuit of a transmitter (Tx), a pre-emphasis filter 102 receives a data signal S and generates a filtered data signal Sw. In particular, the pre-emphasis filter 102 increases the magnitude of the high-frequency portion of the data signal S and thus generates the filtered data signal Sw.

After the filtered data signal Sw is transmitted from a first end of a channel 104 to a second end of the channel 104, the filtered data signal Sw is turned into a received signal Sx and inputted into the electrical circuit of a receiver (Rx) 110 for reconstructing the data signal Sd.

The receiver 110 comprises a data sampler 113, an edge sampler 115, a clock data recovering circuit 117, a decision feedback equalizer 119 and an adder 111.

Generally, the received signal Sx from the second end of the channel 104 is inputted into the receiver 110. By the adder 111, a feedback equalization signal Sf from the decision feedback equalizer 119 and the received signal Sx are superposed with each other to generate a superposed signal Sz.

The data sampler 113 samples the superposed signal Sz according to a data clock dCLK and thus generates a sampled data signal Sd. Moreover, the edge sampler 115 samples the superposed signal Sz according to an edge clock eCLK and thus generates a sampled edge signal Sedg.

The clock data recovering circuit 117 receives the sampled data signal Sd and the sampled edge signal Sedg and thus generates the data clock dCLK and the edge clock eCLK. The decision feedback equalizer 119 receives the sampled data signal Sd and thus generates the feedback equalization signal Sf.

As mentioned above, the receiver 110 is used for sampling the data and the data edge of the superposed signal Sz and generating the data clock dCLK and the edge clock eCLK by using the clock data recovering circuit 117. In this kind of receiver 110, the clock data recovering circuit 117 has to generate the data clock dCLK and the edge clock eCLK at double data rate in order to over-sample the superposed signal Sz. Moreover, the phase difference between the data clock dCLK and the edge clock eCLK is 180 degrees.

For example, if the data rate of the data signal S is 16 Gbps, it is necessary for the clock data recovering circuit 117 to generate the data clock dCLK and the edge clock eCLK at double data rate (e.g. 32 GHz) in order to reconstruct the data signal S.

Moreover, the clock data recovering circuit 117 further comprises a bang-bang phase detector for receiving the sampled data signal Sd and the sampled edge signal Sedg and generating a phase update information. According to the phase update information, the phases of the data clock dCLK and the edge clock eCLK are correspondingly adjusted.

SUMMARY OF THE INVENTION

An embodiment of the present invention provides a receiver capable of tuning boost level and pole according to coefficients of DFE. The receiver comprises: a continuous time linear equalizer receiving a received signal, and generating a first equalized signal by processing the received signal according to a pole and a boost level; a slicing circuit coupled to the continuous time linear equalizer, generating a data signal according to the first equalized signal and a feedback equalization signal; a decision feedback equalizer coupled to the slicing circuit, generating the feedback equalization signal by processing the data signal according to a decision feedback equalizer coefficient set, wherein the boost level is adjusted according to a first decision feedback equalizer coefficient of the decision feedback equalizer coefficient set.

Another embodiment of the present invention provides a control method of the receiver. Firstly, the boost level and a pole of the continuous time linear equalizer are adjusted to the highest boost level and the smallest pole, respectively. Then, the decision feedback equalizer coefficient set is continuously received. If the first decision feedback equalizer coefficient of the decision feedback equalizer coefficient set is smaller than a first threshold value, the boost level is decreased until the first decision feedback equalizer coefficient is not smaller than the first threshold value. If a second decision feedback equalizer coefficient of the decision feedback equalizer coefficient set is smaller than a second threshold value, the pole of the continuous time linear equalizer is increased until the second decision feedback equalizer coefficient is not smaller than the second threshold value.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
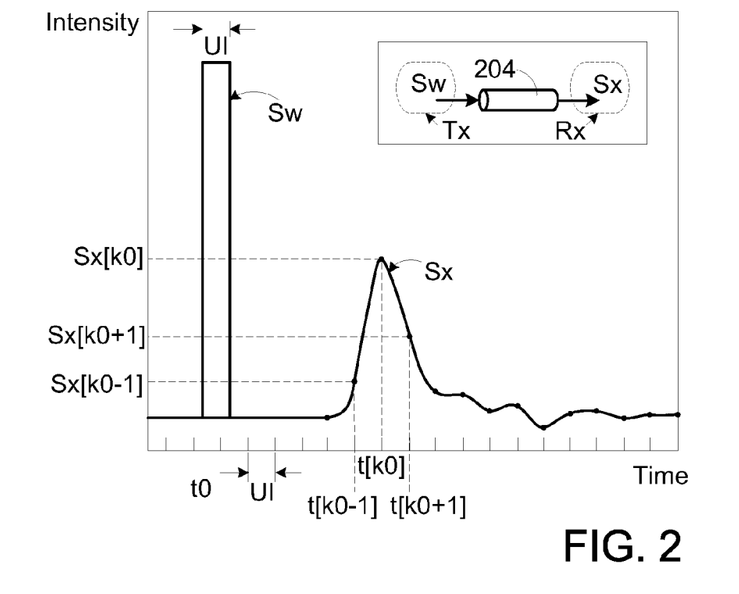
FIG. 2 schematically illustrates the channel impact on the signal transmission.

FIG. 2 schematically illustrates the channel impact on the signal transmission. As shown in FIG. 2, a transmitter Tx is connected with a receiver Rx via a channel 204. When the transmitter Tx intends to send a filtered data signal Sw to the receiver Rx, a filtered data signal Sw propagates through the channel 204 to form a received signal Sx. Consequently, the received signal Sx is received by the receiver Rx. In the example of FIG. 2, the filtered data signal Sw carries a logic 1 symbol with a square wave staring at the time point t0 and lasting for an interval UI. Due to waveform distortion caused by the channel 204, the square wave in the filtered data signal Sw becomes a slowly rising and falling waveform in the received signal Sx. As the receiver Rx samples the received signal Sx, the logic 1 symbol corresponds to a peak sample Sx[k0] forming a main cursor at the time point t[k0]. The portion of the received signal Sx before the time point t[k0] forms a pre-cursor such as a sample Sx[k0−1] at the time point t[k0−1]. The portion of the received signal Sx after the time point t[k0] forms a post-cursor such as a sample Sx[k0+1] at the time point t[k0+1]. The interval between every two consecutive ones of the time points t[k0−1], t[k0] and t[k0+1] may be equal to the interval UI.

Under an ideal circumstance, the intensity of the pre-cursor and the intensity of the post-cursor should be equal to zero, and only main cursor is left. However, owing to the non-ideal influence caused by channel characteristics, the received signal Sx will suffer pre-cursor and the post-cursor with certain intensities, and hence induce the inter-symbol interference (ISI).

Figure 3:
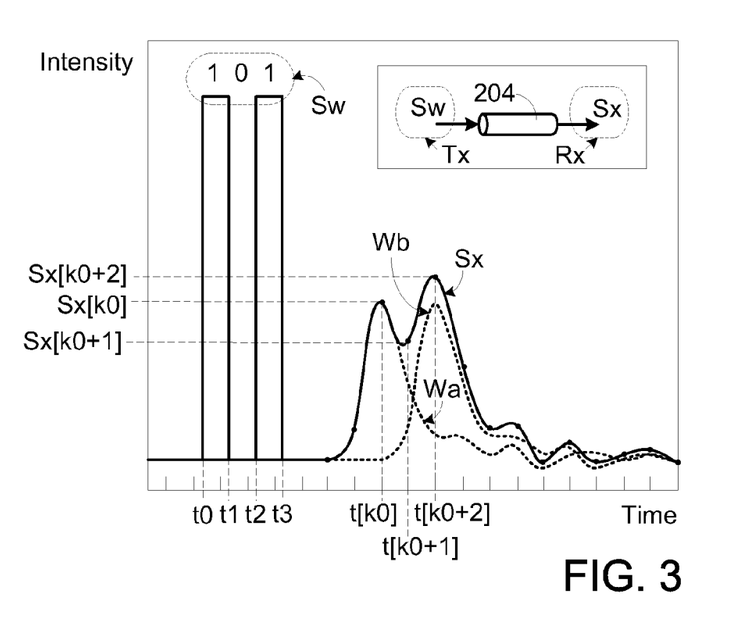
FIG. 3 schematically illustrates the inter-symbol interference in the received signal.

Following FIG. 2, please refer to FIG. 3. FIG. 3 schematically illustrates the inter-symbol interference in the received signal. As shown in FIG. 3, the filtered data signal Sw carries three consecutive symbols from the time point t0 to the time point t3, respectively. The three consecutive symbols include a logic 1 symbol, a logic 0 symbol and a logic 1 symbol. Due to waveform distortion caused by the channel 204, the square wave of the logic 1 symbol between the time point t0 and the time point 1 forms a waveform Wa in the receiver Rx, and the logic 1 symbol between the time point t2 and the time point t3 forms a waveform Wb in the receiver Rx. The received signal Sx in the receiver Rx is a combination of the waveforms Wa and Wb. The logic 1 symbol, the logic 0 symbol and the logic 1 symbol in the filtered data signal Sw correspond to the samples Sx[k0], Sx[k0+1] and Sx[k0+2] of the received signal Sx, respectively.

Please refer to FIG. 3 again. Similarly, the portion of the waveform Wa of the received signal Sx after the time point t[k0] forms a post-cursor, and the portion of the waveform Wb of the received signal Sx before the time point t[k0+2] forms a pre-cursor. Since the post-cursor of the waveform Wa and the pre-cursor of the waveform Wb sum up at the time point t[k0+1], the intensity of the sample Sx[k0+1] will not decrease to zero. Under this circumstance, sample Sx[k0+1] originally representing the logic 0 symbol will be incorrectly determined to be logic 1 because of ISI. According to the discussions of FIG. 2 and FIG. 3, the influences of the pre-cursor and the post-cursor should be fully taken into consideration in order to compensate the channel characteristics and suppress ISI.

Generally, the decision feedback equalizer of the receiver can implement a decision feedback equalization mechanism to suppress influence of post-cursor from the received signal Sx and thus generate the superposed signal Sz. This equalization mechanism can be exemplified by FIG. 4. In response to a logic 1 symbol, the signal Sy exhibits a slowly rising and falling waveform, which reflects the logic 1 by a sample Sz[k] of the superposed signal Sz, but still includes a post-cursor of certain intensity. However, after the decision feedback equalization, the post-cursor of the received signal Sx can be annihilated by the feedback equalization signal. Consequently, the samples Sz[k] and Sz[k+1] corresponding to the post-cursor can approach zero to suppress ISI.

Figure 4:
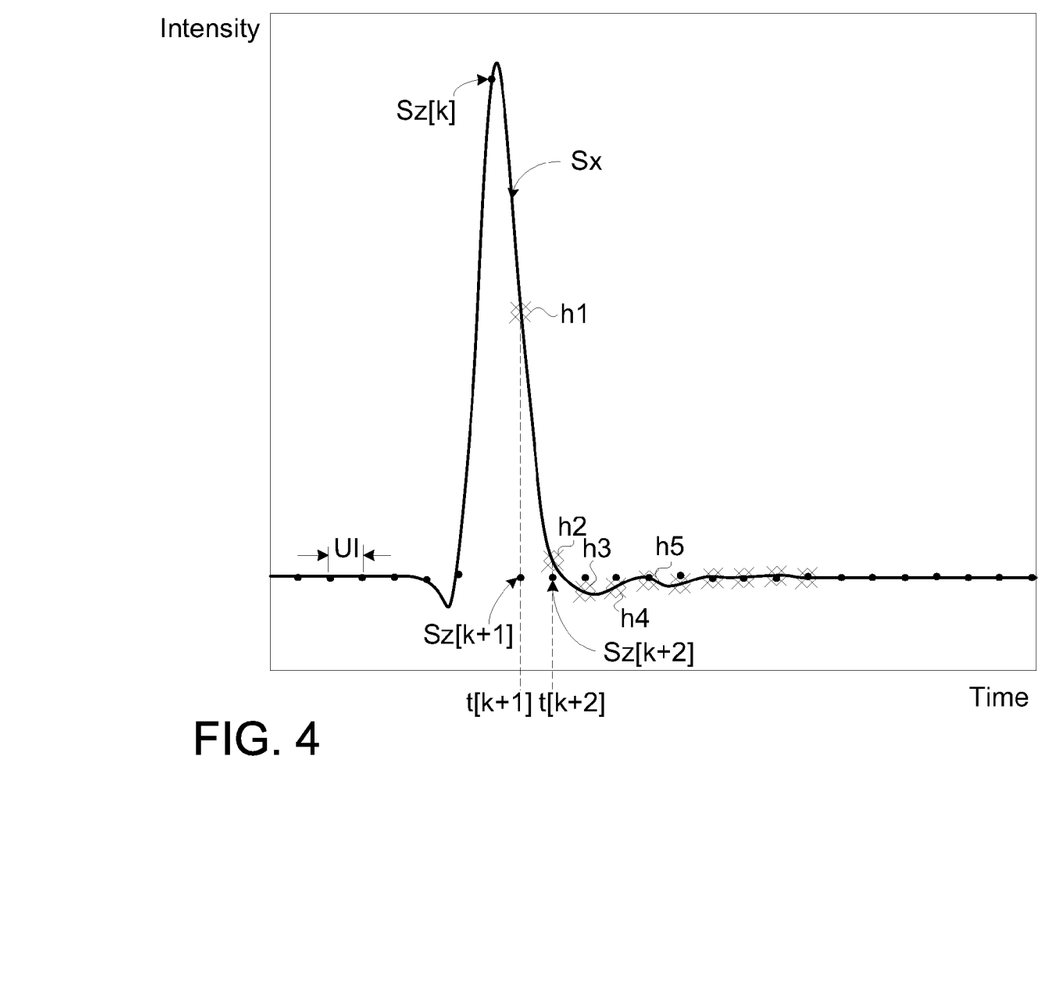
FIG. 4 schematically illustrates the equalization result by a decision feedback equalization mechanism.

For annihilating the post-cursor of the received signal Sx, the decision feedback equalizer has to generate the feedback equalization signal according to the change of a decision feedback equalizer coefficient set (also referred as a DFE coefficient set). The DFE coefficient set contains the coefficients h1, h2, h3, h4 and h5. As shown in FIG. 4, the coefficient h1 is greater than the coefficient h2 because the intensity of the superposed signal Sz at the time point t[k+1] is greater than that at the time point t[k+2].

Figure 5:
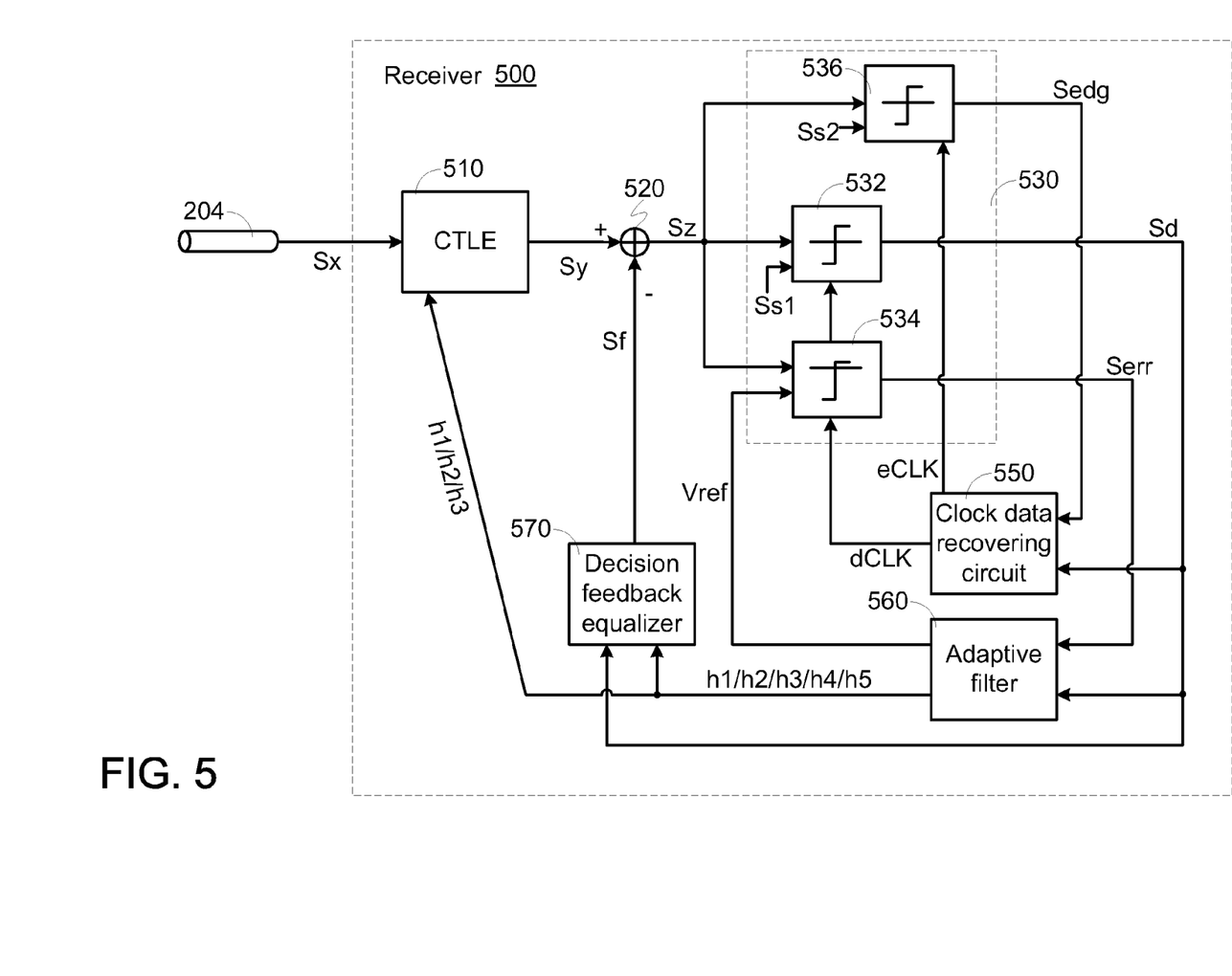
FIG. 5 is a schematic circuit diagram illustrating a receiver according to a first embodiment of the present invention.

FIG. 5 is a schematic circuit diagram illustrating a receiver according to a first embodiment of the present invention. As shown in FIG. 5, the receiver 500 comprises a continuous time linear equalizer (CTLE) 510, a slicing circuit 530, a clock data recovery (CDR) circuit 550, a least mean square based adaptive filter 560, a decision feedback equalizer (DFE) 570 and an adder 520. The slicing circuit 530 comprises a data slicer 532, an error slicer 534 and an edge slicer 536.

As shown in FIG. 5, the second end of the channel 204 is connected with the receiver Rx. Consequently, the received signal Sx is inputted into the continuous time linear equalizer 510 of the receiver 500. The continuous time linear equalizer 510 increases the magnitude of the high-frequency portion of the received signal Sx and thus generates a first equalized signal Sy. By the adder 520, a feedback equalization signal Sf from the decision feedback equalizer 570 and the first equalized signal Sy are superposed with each other to generate a superposed signal Sz.

The data slicer 532 of the slicing circuit 530 is used for slicing the superposed signal Sz according to a first slicing voltage Ss1 and a data clock dCLK and generating a data signal Sd. The edge slicer 536 of the slicing circuit 530 is used for slicing the superposed signal Sz according to a second slicing voltage Ss2 and an edge clock eCLK and thus generates an edge signal Sedg. The error slicer 534 of the slicing circuit 530 is used for slicing the superposed signal Sz according to a reference voltage Vref and the data clock dCLK and generating an error signal Serr. In an embodiment, the first slicing voltage Ss1 and the second slicing voltage Ss2 have the same voltage level (for example, 0V).

The clock data recovery circuit 550 receives the data signal Sd and the edge signal Sedg and thus generates the data clock dCLK and the edge clock eCLK to the slicing circuit 530. Moreover, after the adaptive filter 560 receives the data signal Sd and the error signal Serr, the adaptive filter 560 generates the reference voltage Vref to the error slicer 534 and generates a DFE coefficient set to the decision feedback equalizer 570 and the continuous time linear equalizer 510. Generally, the reference voltage Vref and the DFE coefficient set are dynamically adjusted by the adaptive filter 560 according to the data signal Sd and the error signal Serr. In an embodiment, the DFE coefficient set contains the decision feedback equalizer coefficients h1, h2, h3, h4 and h5. It is noted that the number of the decision feedback equalizer coefficients of the DFE coefficient set is not restricted.

After the decision feedback equalizer 570 receives the data signal Sd and the DFE coefficient set, the decision feedback equalizer 570 generates the feedback equalization signal Sf to the adder 520 in order for annihilating the post-cursor of the first equalized signal Sy. Moreover, the relationship between the superposed signal Sz, the feedback equalization signal Sf and the first equalized signal Sy may be expressed as:

$$Sz[k] = Sy[k] - \sum_{i=1}^{5} h_i \cdot Sd[k-i]$$

Moreover, the frequency response of the continuous time linear equalizer 510 is adjusted according to the DFE coefficient set. For example, the boost level and the pole of the continuous time linear equalizer 510 are adjusted according to the DFE coefficient set. Generally, the boost level is correlated with the gain value of the continuous time linear equalizer 510.

The receiver 500 of the first embodiment samples the data and the data edge of the superposed signal Sz and generates the data clock dCLK and the edge clock eCLK by using the clock data recovering circuit 550. In the receiver 500, the clock data recovering circuit 550 has to generate the data clock dCLK and the edge clock eCLK at double data rate in order to over-sample the superposed signal Sz. Moreover, the phase difference between the data clock dCLK and the edge clock eCLK is 180 degrees.

Moreover, the clock data recovering circuit 550 further comprises a bang-bang phase detector (not shown) for receiving the data signal Sd and the edge signal Sedg and generating a phase update information. According to the phase update information, the phases of the data clock dCLK and the edge clock eCLK are correspondingly adjusted.

Figure 6A:
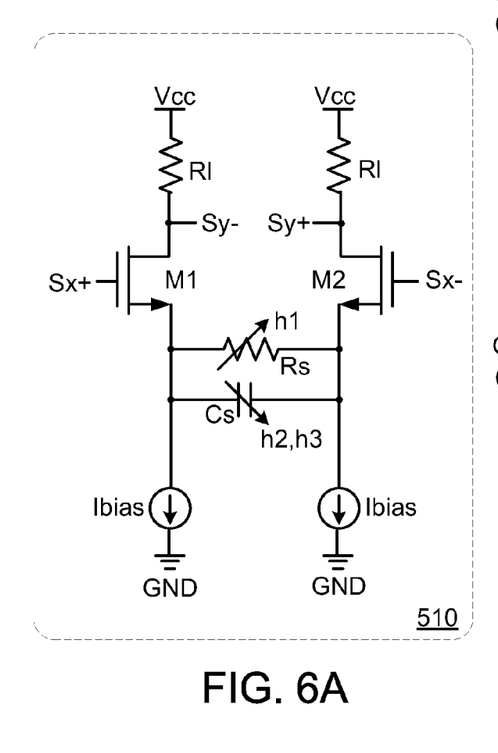
FIG. 6A is a schematic circuit diagram illustrating the continuous time linear equalizer of the receiver according to the first embodiment of the present invention.

FIG. 6A is a schematic circuit diagram illustrating the continuous time linear equalizer of the receiver according to the first embodiment of the present invention. As shown in FIG. 6A, the continuous time linear equalizer 510 comprises a load Rl, a bias current source Ibias, a first transistor M1, a second transistor M2, a variable resistor Rs and a variable capacitor Cs. Both of the received signal Sx and the first equalized signal Sy are differential signals.

The gate terminal of the first transistor M1 is a first input terminal that receives a positive received signal Sx+. The drain terminal of the first transistor M1 is a first output terminal that generates a negative first equalized signal Sy−. The bias current source Ibias is connected between the source terminal of the first transistor M1 and a ground terminal GND. The gate terminal of the second transistor M2 is a second input terminal that receives a negative received signal Sx−. The drain terminal of the second transistor M2 is a second output terminal that generates a positive first equalized signal Sy+. The bias current source Ibias is connected between the source terminal of the second transistor M2 and the ground terminal GND. Moreover, the load Rl is connected between the first output terminal and a power supply voltage Vcc, and the load Rl is connected between the second output terminal and the power supply voltage Vcc. The variable resistor Rs and the variable capacitor Cs are connected between the source terminal of the first transistor M1 and the source terminal of the second transistor M2.

In an embodiment, the resistance value of the variable resistor Rs is determined according to the first decision feedback equalizer coefficient h1, and the capacitance value of the variable capacitor Cs is determined according to the second decision feedback equalizer coefficient h2 and the third decision feedback equalizer coefficient h3.

If the continuous time linear equalizer 510 over-equalizes channel loss, the first decision feedback equalizer coefficient h1 is negative. Under this circumstance, the resistance value of the variable resistor Rs is adjusted so as to increase the boost level (i.e., the gain value). If the pole is too small, the second decision feedback equalizer coefficient h2 and the third decision feedback equalizer coefficient h3 are negative. Under this circumstance, the capacitance value of the variable capacitor Cs is adjusted so as to control the pole position.

Figure 6B:
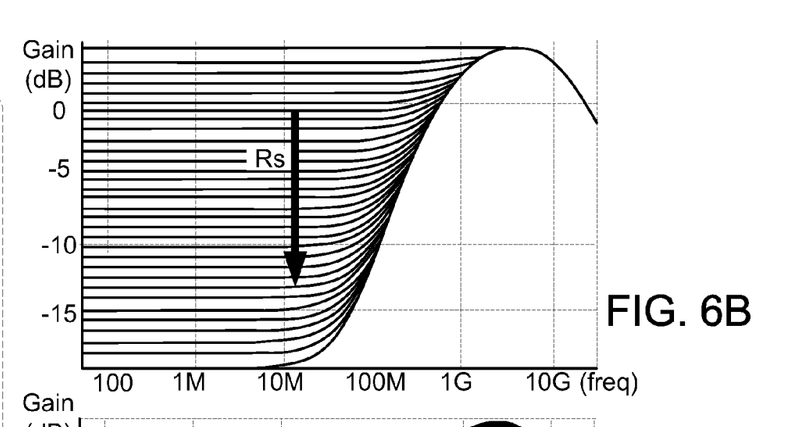
FIG. 6B is a frequency response diagram illustrating the relationship between the resistance value of the variable resistor and the boost level of the continuous time linear equalizer of FIG. 6A.

FIG. 6B is a frequency response diagram illustrating the relationship between the resistance value of the variable resistor and the boost level of the continuous time linear equalizer of FIG. 6A. Generally, as the resistance value of the variable resistor Rs increases, the boost level increases. If the boost level is too large, the first decision feedback equalizer coefficient h1 becomes negative.

Figure 6C:
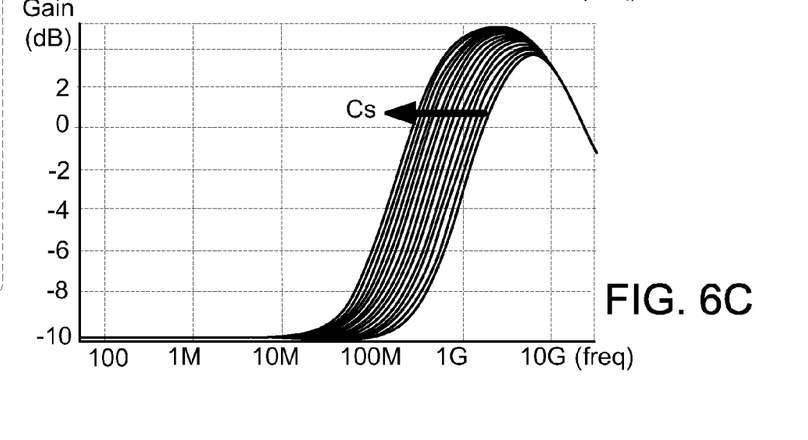
FIG. 6C is a frequency response diagram illustrating the relationship between the capacitance value of the variable capacitor and the boost level of the continuous time linear equalizer of FIG. 6A.

FIG. 6C is a frequency response diagram illustrating the relationship between the capacitance value of the variable capacitor and the boost level of the continuous time linear equalizer of FIG. 6A. Generally, as the capacitance value of the variable capacitor Cs increases, the pole decreases. If the pole is too small, the second decision feedback equalizer coefficient h2 and the third decision feedback equalizer coefficient h3 are negative.

The transfer function H(s) of the continuous time linear equalizer with two-pole and one-zero may be expressed as:

$$H(s) = \frac{Adc \cdot \omega_{p1} \cdot \omega_{p2} \cdot (s + \omega_z)}{\omega_z \cdot (s + \omega_{p1}) \cdot (s + \omega_{p2})}, \text{ and let } k = \frac{Adc \cdot \omega_{p1} \cdot \omega_{p2}}{\omega_z}$$

$$H(s) = \frac{k1}{s + \omega_{p1}} + \frac{k2}{s + \omega_{p2}}, k1 = \frac{\omega_{p1} - \omega_z}{\omega_{p1} - \omega_{p2}} \cdot k, k2 = \frac{\omega_{p2} - \omega_z}{\omega_{p2} - \omega_{p1}} \cdot k$$

And the impulse response h(t) of the continuous time linear equalizer may be expressed as:

$h(t) = k1 \cdot e^{-\omega_{p1} \cdot t} + k2 \cdot e^{-\omega_{p2} \cdot t}$, wherein Adc is a DC gain, $\omega_{p1}$ and $\omega_{p2}$ are two poles, $\omega_z$ is zero, and coefficient k1 is a negative value.

Figure 7A:
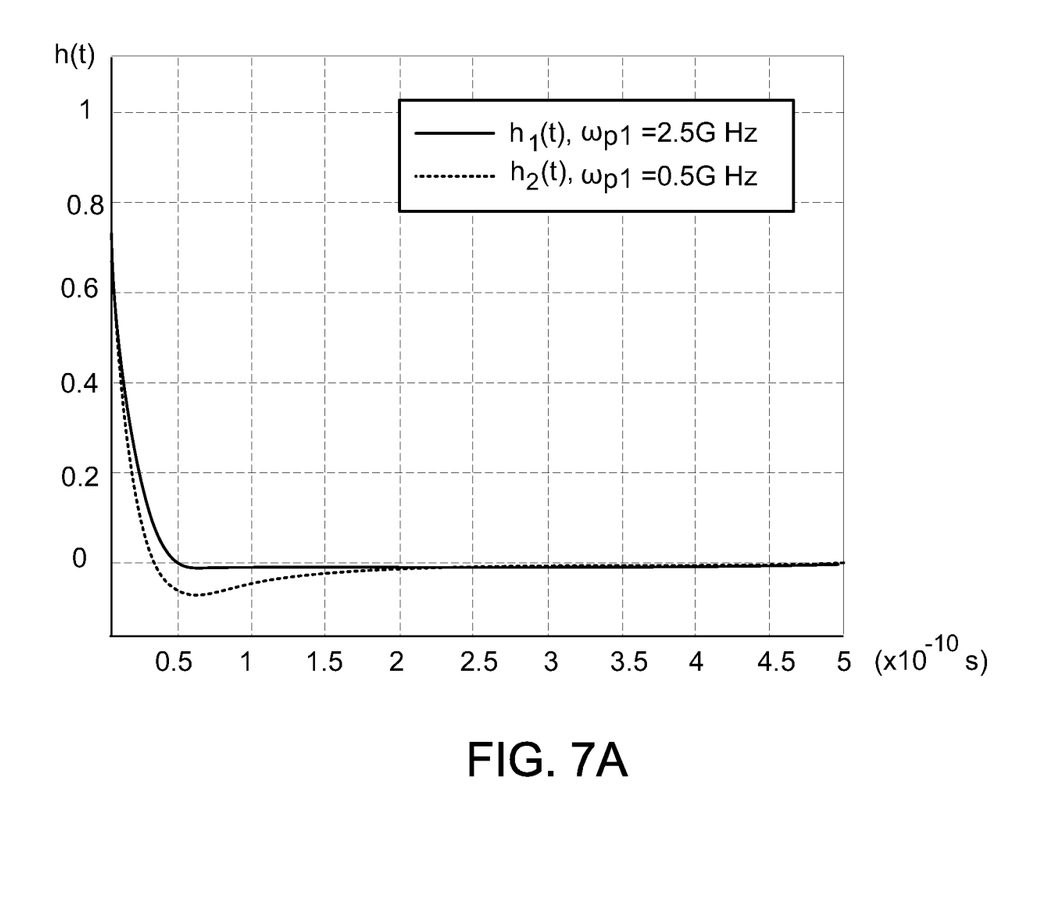
FIG. 7A schematically illustrates impulse responses $h_1(t)$ and $h_2(t)$ of continuous time linear equalizer having different dominant-pole $\omega_{p1}$.

FIG. 7A schematically illustrates impulse responses $h_1(t)$ and $h_2(t)$ of continuous time linear equalizer having different dominant-pole $\omega_{p1}$. Since k1 is negative, the impulse response $h_2(t)$ with smaller pole $\omega_{p1}$ (0.5 GHz) will show longer negative tail due to the slower attenuation in the exponential function.

Figure 7B:
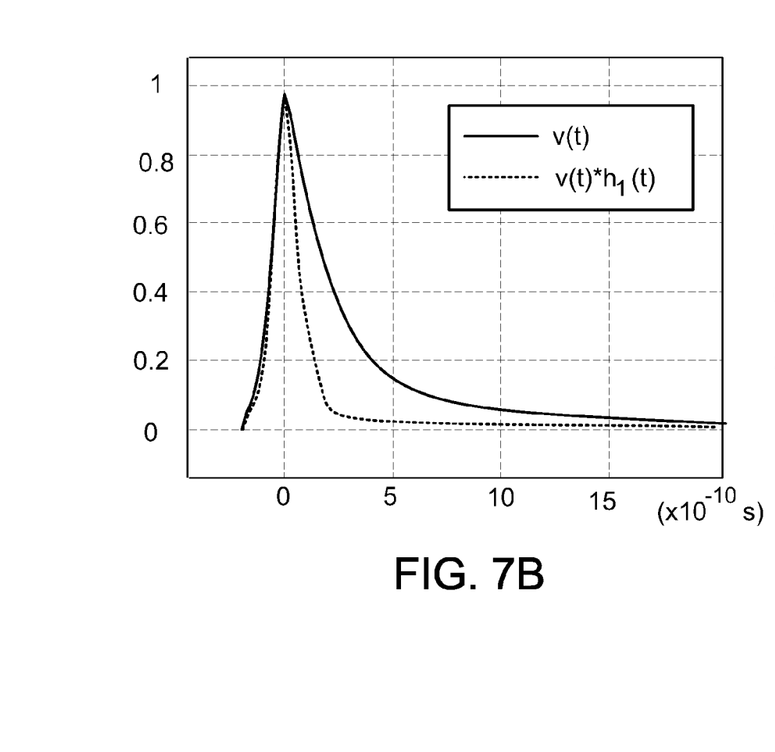
FIG. 7B schematically illustrates a convolution of a channel impulse response v(t) with an impulse response $h_1(t)$ of continuous time linear equalizer.

FIG. 7B schematically illustrates a convolution of a channel impulse response v(t) with an impulse response $h_1(t)$ of continuous time linear equalizer having larger pole $\omega_{p1}$ (2.5 GHz). And, FIG. 7C schematically illustrates a convolution of a channel impulse response v(t) with an impulse response $h_2(t)$ of continuous time linear equalizer having smaller pole $\omega_{p1}$ (0.5 GHz).

Figure 7C:
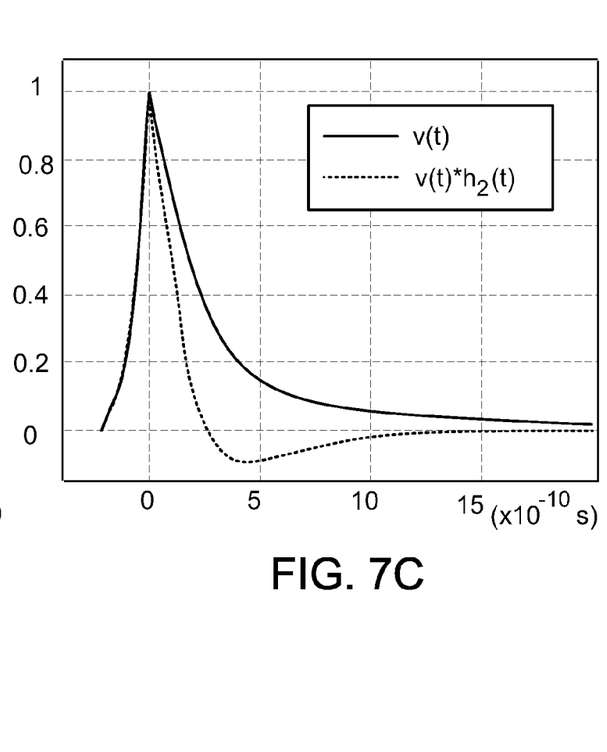
FIG. 7C schematically illustrates a convolution of a channel impulse response v(t) with an impulse response $h_2(t)$ of continuous time linear equalizer.

As shown in FIG. 7C, the convolution of channel impulse response v(t) with the impulse response $h_2(t)$ of continuous time linear equalizer will usually result in negative values of h2 and h3 of the DFE coefficient set. Moreover, the convolution of channel impulse response v(t) with the impulse response h1(*t*) having larger pole will have positive values of h2 and h3 of the DFE coefficient set. That is to say, the residual ISI can be estimated by h2 and h3 calculated by the adaptive filter 560.

According to the embodiment of the present invention, the boost level and pole of the continuous time linear equalizer 510 is controller by the DFE coefficient set. For example, if the continuous time linear equalizer 510 over-equalizes the channel loss, the first decision feedback equalizer coefficient h1 usually shows negative value. If the pole is too small, the second decision feedback equalizer coefficient h2 and the third decision feedback equalizer coefficient h3 are usually negative. That is to say, resistance value of the variable resistor Rs in the continuous time linear equalizer 510 is determined according to the first decision feedback equalizer coefficient h1, and the capacitance value of the variable capacitor Cs in the continuous time linear equalizer 510 is determined according to the second decision feedback equalizer coefficient h2 and the third decision feedback equalizer coefficient h3. In this way, the continuous time linear equalizer 510 can get the target equalization level by using the DFE coefficient set.

Figure 8:
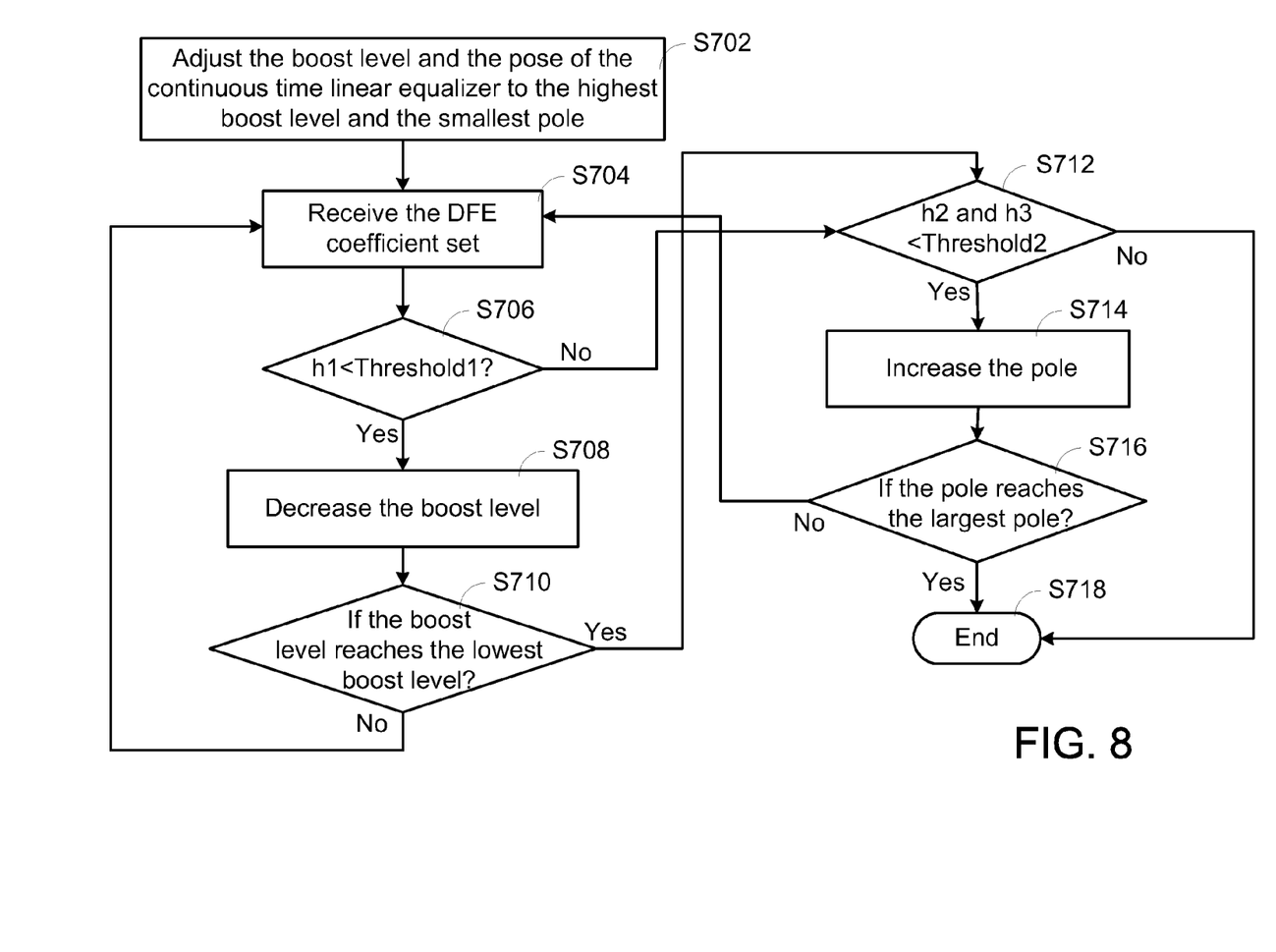
FIG. 8 is a flowchart illustrating a control method of the continuous time linear equalizer of the receiver according to an embodiment of the present invention.

FIG. 8 is a flowchart illustrating a control method of the continuous time linear equalizer of the receiver according to an embodiment of the present invention.

Firstly, the variable resistor Rs and the variable capacitor Cs of the continuous time linear equalizer 510 are adjusted to provide the highest boost level and the smallest pole (Step S702). Then, the DFE coefficient set is received (Step S704).

Then, the step S706 is performed to judge whether the first decision feedback equalizer coefficient h1 is smaller than a first threshold value (i.e. h1<Threshold1). For example, the first threshold value Threshold1 is 0. In this step, If the first decision feedback equalizer coefficient h1 is smaller than the first threshold value, this means the continuous time linear equalizer 510 over-equalizes the channel loss and the boost level has to be decreased.

If the judging condition of the step S706 is satisfied, the boost level is decreased by adjusting the resistance value of the variable resistor Rs (Step S708). Then, the step S710 is performed to judge whether the adjusted boost level reaches the lowest boost level. If the judging condition of the step S710 is not satisfied, the step S704 is repeatedly done.

Whereas, if the judging condition of the step S706 is not satisfied or if the judging condition of the step S710 is satisfied, the step S712 is performed to judge whether the second decision feedback equalizer coefficient h2 and the third decision feedback equalizer coefficient h3 are smaller than a second threshold value (i.e. h2 and h3<Threshold2). For example, the second threshold value Threshold2 is 0. In this step, If the second decision feedback equalizer coefficient h2 and the third decision feedback equalizer coefficient h3 are smaller than the second threshold value, this means the continuous time linear equalizer 510 has a small pole and it should be increased to a larger pole.

If the judging condition of the step S712 is not satisfied, the adjustment is ended (Step S718).

Whereas, if the judging condition of the step S712 is satisfied, the pole is increased by adjusting the capacitance value of the variable capacitor Cs (Step S714). Then, the step S716 is performed to judge whether the pole is the largest pole. If the judging condition of the step S716 is not satisfied, the step S704 is repeatedly done. Whereas, if the judging condition of the step S716 is satisfied, the adjustment is ended (Step S718).

In the control method described in FIG. 8, the continuous time linear equalizer 510 is firstly adjusted to provide the highest boost level and the smallest pole, and the DFE coefficient set is continuously received. If the first decision feedback equalizer coefficient h1 is smaller than the first threshold value (i.e. h1<Threshold1), the boost level is decreased until the first decision feedback equalizer coefficient h1 is not smaller than the first threshold value. Moreover, if the second decision feedback equalizer coefficient h2 and the third decision feedback equalizer coefficient h3 are smaller than the second threshold value (i.e. h2 and h3<Threshold2), the pole is increased until the second decision feedback equalizer coefficient h2 and the third decision feedback equalizer coefficient h3 are not smaller than the second threshold value.

In other words, the boost level of the continuous time linear equalizer 510 is adjusted by changing the resistance value of the variable resistor according to the first decision feedback equalizer coefficient h1, and the pole of the continuous time linear equalizer 510 is adjusted by changing the capacitance value of the variable capacitor according to the second decision feedback equalizer coefficient h2 and the third decision feedback equalizer coefficient h3.

It is noted that numerous modifications and alterations may be made while retaining the teachings of the invention. For example, in another embodiment, the capacitance value of the variable capacitor is changed according to one of the second decision feedback equalizer coefficient h2 and the third decision feedback equalizer coefficient h3. Alternatively, the capacitance value of the variable capacitor is changed according to the relationship between the second decision feedback equalizer coefficient h2 and the third decision feedback equalizer coefficient h3 (e.g., the sum of the second decision feedback equalizer coefficient h2 and the third decision feedback equalizer coefficient h3).

Figure 9:
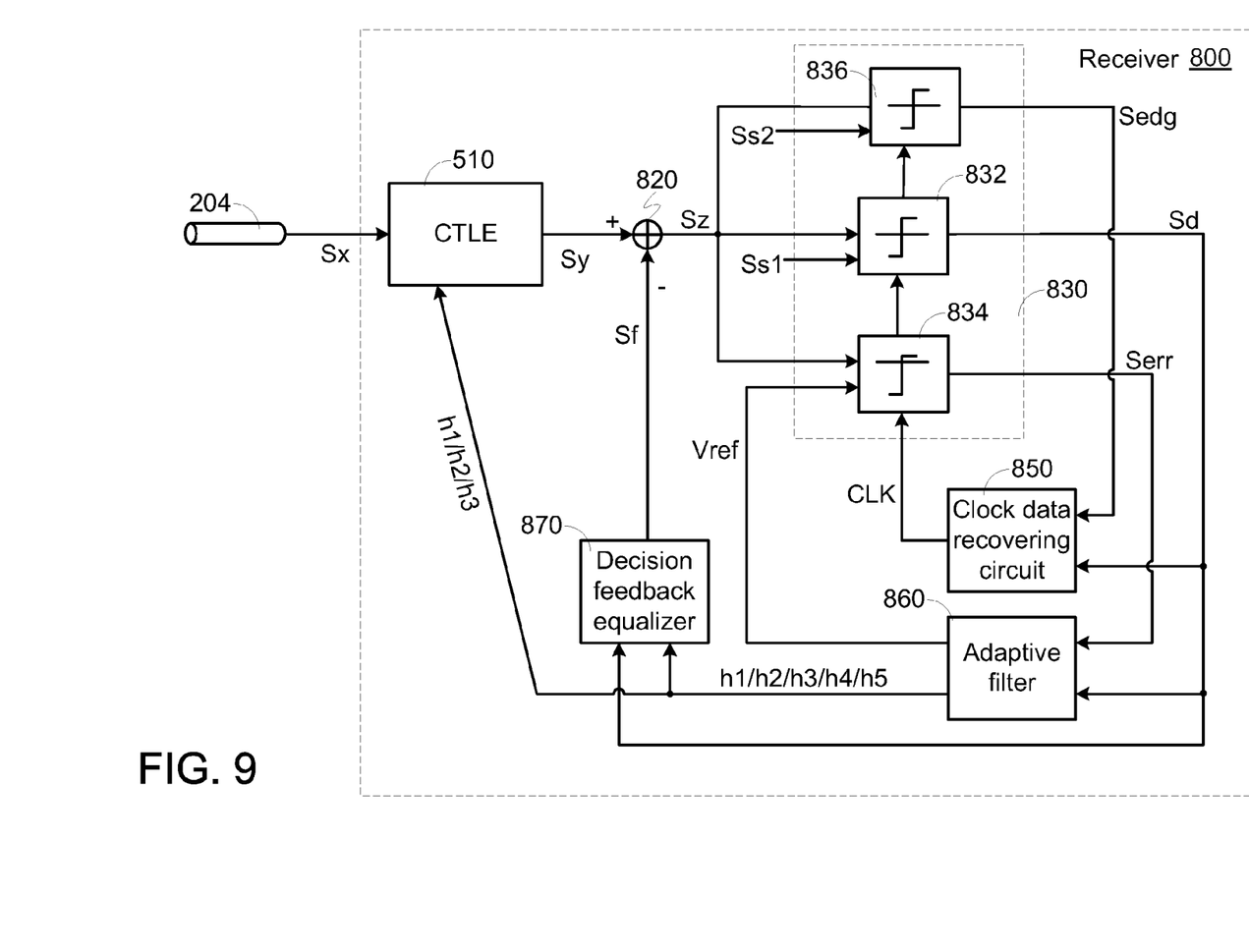
FIG. 9 is a schematic circuit diagram illustrating a receiver according to a second embodiment of the present invention.

FIG. 9 is a schematic circuit diagram illustrating a receiver according to a second embodiment of the present invention. As shown in FIG. 9, the receiver 800 comprises a continuous time linear equalizer (CTLE) 510, a slicing circuit 830, a clock data recovery (CDR) circuit 850, a least mean square based adaptive filter 860, a decision feedback equalizer (DFE) 870 and an adder 820. The slicing circuit 830 comprises a data slicer 832 and an error slicer 834.

As shown in FIG. 9, the second end of the channel 204 is connected with the electrical circuit of the receiver Rx. Consequently, the received signal Sx is inputted into the continuous time linear equalizer 510 of the receiver 800. The continuous time linear equalizer 510 increases the magnitude of the high-frequency portion of the received signal Sx and thus generates a first equalized signal Sy. By the adder 820, a feedback equalization signal Sf from the decision feedback equalizer 870 and the first equalized signal Sy are superposed with each other to generate a superposed signal Sz.

The data slicer 832 of the slicing circuit 830 is used for slicing the superposed signal Sz according to a first slicing voltage Ss1 and a clock signal CLK and generating a data signal Sd. The edge slicer 836 of the slicing circuit 830 is used for slicing the superposed signal Sz according to a second slicing voltage Ss2 and the clock signal CLK and thus generates an edge signal Sedg. Moreover, the error slicer 834 of the slicing circuit 830 is used for slicing the superposed signal Sz according to a reference voltage Vref and the clock signal CLK and generating an error signal Serr.

The clock data recovery circuit 850 receives the data signal Sd and the edge signal Sedg and thus generates the clock signal CLK to the slicing circuit 830. Moreover, after the least mean square based adaptive filter 860 receives the data signal Sd and the error signal Serr, the adaptive filter 860 generates the reference voltage Vref to the error slicer 834 and generates a DFE coefficient set to the decision feedback equalizer 870 and the continuous time linear equalizer 510.

Generally, the reference voltage Vref and the DFE coefficient set are dynamically adjusted by the least mean square based adaptive filter 860 according to the data signal Sd and the error signal Serr. In an embodiment, the DFE coefficient set contains the decision feedback equalizer coefficients h1, h2, h3, h4 and h5. It is noted that the number of the decision feedback equalizer coefficients of the DFE coefficient set is not restricted.

Moreover, the decision feedback equalizer 870 receives the data signal Sd and the DFE coefficient set and thus generates the feedback equalization signal Sf to the adder 820 in order for annihilating the post-cursor of the first equalized signal Sy. Moreover, the relationship between the superposed signal Sz, the feedback equalization signal Sf and the first equalized signal Sy may be expressed as:

$$Sz[k] = Sy[k] - \sum_{i=1}^{5} h_i \cdot Sd[k-i]$$

Moreover, the frequency response of the continuous time linear equalizer 510 is adjusted according to the DFE coefficient set. For example, the boost level and the pole of the continuous time linear equalizer 510 are adjusted according to the DFE coefficient set. Generally, the boost level is correlated to the gain value of the continuous time linear equalizer 510.

The receiver 800 of the second embodiment samples the data and the phase error of the superposed signal Sz according to the same clock signal CLK.

From the above descriptions, the present invention provides a receiver and a control method for a receiver. In accordance with the present invention, the boost level of the continuous time linear equalizer 510 is adjusted by changing the resistance value of the variable resistor according to the first decision feedback equalizer coefficient h1, and the pole of the continuous time linear equalizer 510 is adjusted by changing the capacitance value of the variable capacitor according to the second decision feedback equalizer coefficient h2 and the third decision feedback equalizer coefficient h3.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A receiver, comprising:
    a continuous time linear equalizer receiving a received signal, and generating a first equalized signal by processing the received signal according to a pole and a boost level;
    a slicing circuit coupled to the continuous time linear equalizer, generating a data signal according to the first equalized signal and a feedback equalization signal;
    a decision feedback equalizer coupled to the slicing circuit, generating the feedback equalization signal by processing the data signal according to a decision feedback equalizer coefficient set,
    wherein the boost level is decreased from a highest boost level if a first decision feedback equalizer coefficient of the decision feedback equalizer coefficient set is smaller than a first threshold value.

2. The receiver as claimed in claim 1, wherein a pole of the continuous time linear equalizer is adjusted according to a second decision feedback equalizer coefficient and a third decision feedback equalizer coefficient of the decision feedback equalizer coefficient set.

3. The receiver as claimed in claim 1, wherein the continuous time linear equalizer is connected with a channel and receives the received signal from the channel.

4. The receiver as claimed in claim 1, wherein the received signal contains a positive received signal and a negative received signal, and the first equalized signal contains a positive first equalized signal and a negative first equalized signal, wherein the continuous time linear equalizer comprises:
- a first transistor, wherein a gate terminal of the first transistor is a first input terminal receiving the positive received signal, and a drain terminal of the first transistor is a first output terminal generating the negative first equalized signal;
- a second transistor, wherein a gate terminal of the second transistor is a second input terminal receiving the negative received signal, and a drain terminal of the second transistor is a second output terminal generating the positive first equalized signal;
- a first bias current source connected between a source terminal of the first transistor and a ground terminal;
- a second bias current source connected between a source terminal of the second transistor and the ground terminal;
- a first load connected between the first output terminal and a power supply voltage;
- a second load connected between the second output terminal and the power supply voltage;
- a variable resistor connected between the source terminal of the first transistor and the source terminal of the second transistor; and
- a variable capacitor connected between the source terminal of the first transistor and the source terminal of the second transistor.

5. The receiver as claimed in claim 4, wherein a resistance value of the variable resistor of the continuous time linear equalizer is adjusted according to the first decision feedback equalizer coefficient of the decision feedback equalizer coefficient set.

6. The receiver as claimed in claim 4, wherein a capacitance value of the variable capacitor of the continuous time linear equalizer is adjusted according to a second decision feedback equalizer coefficient and a third decision feedback equalizer coefficient of the decision feedback equalizer coefficient set.

7. The receiver as claimed in claim 1, wherein the slicing circuit comprises:
- a data slicer receiving a superposed signal and a slicing voltage, and generating the data signal, wherein the superposed signal is a sum of the first equalized signal and the feedback equalization; and
- an error slicer receiving the superposed signal and a reference voltage, and generating the error signal.

8. The receiver as claimed in claim 1, wherein the slicing circuit comprises:
- a data slicer receiving a superposed signal and a first slicing voltage, and generating the data signal, wherein the superposed signal is a sum of the first equalized signal and the feedback equalization;
- an edge slicer receiving the superposed signal and a second slicing voltage, and generating an edge signal; and
- an error slicer receiving the superposed signal and a reference voltage, and generating the error signal.

9. A control method of the receiver according to claim 1, the control method comprising steps of:
- (a) adjusting the boost level and a pole of the continuous time linear equalizer to the highest boost level and a smallest pole, respectively;
- (b) continuously receiving the decision feedback equalizer coefficient set;
- (c) if the first decision feedback equalizer coefficient of the decision feedback equalizer coefficient set is smaller than the first threshold value, decreasing the boost level until the first decision feedback equalizer coefficient is not smaller than the first threshold value; and
- (d) if a second decision feedback equalizer coefficient of the decision feedback equalizer coefficient set is smaller than a second threshold value, increasing the pole of the continuous time linear equalizer until the second decision feedback equalizer coefficient is not smaller than the second threshold value.

10. The control method as claimed in claim 9, wherein if a third decision feedback equalizer coefficient of the decision feedback equalizer coefficient set is smaller than the second threshold value, the pole of the continuous time linear equalizer is increased until the third decision feedback equalizer coefficient is not smaller than the second threshold value.

* * * * *